UNITED STATES PATENT OFFICE.

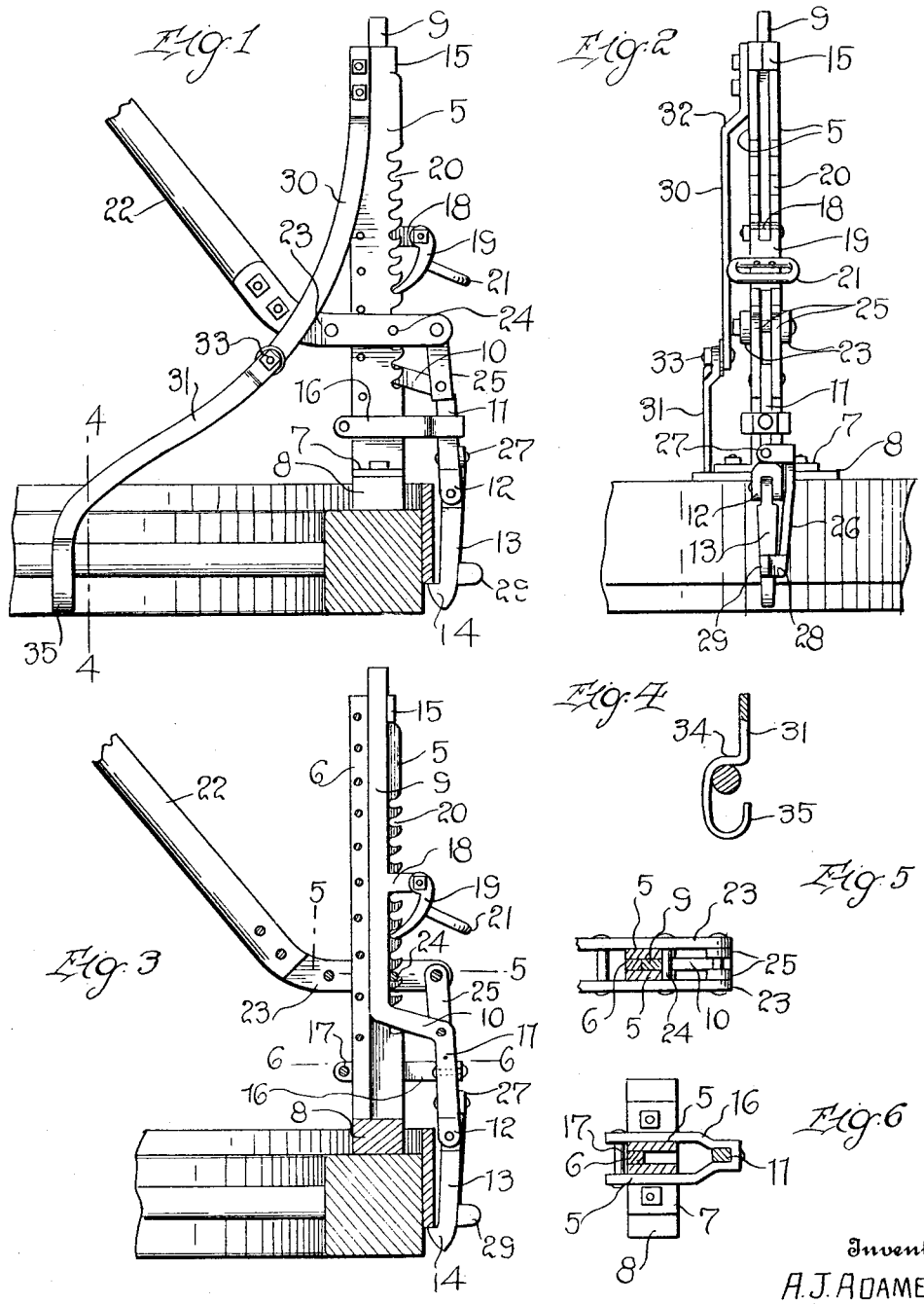

ANTONE J. ADAMEK, OF ORIENT, SOUTH DAKOTA.

TIRE-REMOVER.

1,120,658.  Specification of Letters Patent.  Patented Dec. 15, 1914.

Application filed February 28, 1914. Serial No. 821,739.

*To all whom it may concern:*

Be it known that I, ANTONE J. ADAMEK, a citizen of the United States, residing at Orient, in the county of Faulk and State of South Dakota, have invented certain new and useful Improvements in Tire-Removers, of which the following is a specification, reference being had to the accompanying drawings.

This invention relates to new and useful improvements in tire removers for removing metallic tires or tread bands from a vehicle wheel.

The object of the present invention resides in the provision of a device which may be quickly and adjustably secured to a wheel so that actuation of the device will remove the tire or tread band laterally from the felly of the wheel, it being specifically the object of the invention to provide a device which may be easily and quickly operated.

A further object of the invention resides in the provision of means whereby the tire engaging member may be readily actuated to engage the tire for removing the same after the device has been positioned on the wheel and whereby said member may be securely held against possible accidental displacement.

A still further object of the invention resides in the provision of such a device which possesses a simple structure so that it is exceedingly durable in use and is susceptible of comparatively cheap manufacture.

With these and other objects and advantages in view, the invention resides more particularly in the novel combination and arrangement of parts more fully hereinafter described and reference is had to the accompanying drawings, wherein similar characters of reference designate corresponding parts throughout the several views, and in which—

Figure 1 is a vertical sectional view of my device showing it in applied position. Fig. 2 is an edge view thereof. Fig. 3 is a longitudinal section of the device. Fig. 4 is a detail view of a hook member employed. Fig. 5 is a section on the line 5—5 of Fig. 3. Fig. 6 is a section on the line 6—6 of Fig. 3.

Referring now more particularly to the accompanying drawings, the preferred embodiment of the invention is shown as comprising a body portion including a channel member formed of side plates 5 held in spaced relation by a bar 6 secured between the rear edges of the plates. The lower extremities of the plates are directed laterally at 7 and these laterally directed portions are bolted to a base block 8 formed preferably of wood and adapted to seat on a felly of a wheel to provide a leverage base.

Reciprocal in the channel body section described is a bar 9 which has its lower portion directed laterally and outwardly of the channel section at 10 and provided with a depending extension 11 which has its lower ends forked to provide the furcations 12, between which is pivoted a bar 13 having formed at its lower end a hook 14 adapted to engage the side edge of the tire whereby the tire may be moved laterally on the felly. To hold the bar 9 slidably in the channel the upper portions of the outer edges of the plates 5 are directed inwardly at 15 so that the bar is completely embraced at its upper portion. To hold the lower portion of the bar 9 in position in the channel, a U-shaped strip 16 has its bight portion embracing and secured to the depending extension 11 of the bar. The arms of the U-shaped strip embrace the side plates 5 and extend backwardly thereof and secured to the end portions of these arms is a bolt 17 which slidably bears against the rear edges of the side plates.

To adjustably hold the bar 9 in raised position relative to the channel body portion, the intermediate portion of the bar is provided with an outwardly extending lug 18 on which is pivoted a pawl 19 and the outer side edges of the side plates 5 of the body portion are provided with series of ratchet teeth 20 disposed in horizontal alinement and adapted to receive the pawl 19 in any desired position. Secured on the intermediate portion of the pawl is a handle ring 21 whereby the pawl may be disengaged from the ratchet teeth to permit the bar to be lowered. To raise the bar in successive steps to thus remove the tire, a lever or bar 22 is provided, from the working end of which extends spaced bars 23 embracing the side plates 5 and provided adjacent their free ends with a bolt 24 passed transversely therethrough and adapted to selectively seat in a pair of teeth 20 to serve as a fulcrum. Links 25 are pivoted to the free ends of the bars 23 and are disposed substantially in alinement with the downward extension 11 of the bar 9. The links and bars are pivoted to the upper end of this extension. Thus as the lever 22 is swung downwardly on the pin 24 as a fulcrum, the extension 11 of the bar carrying the hook portion 13 is subjected to a substantially vertical pull. As the extension and consequently the bar is raised the pawl engages in the next pair of ratchet teeth, the handle 21 serving as a weight to hold it in proper position when free. The handle is then raised so that the pivot bolt engages in the next upper pair of notches and the operation is repeated as before.

It is noted that the hook member 13 is pivoted to the downward extension 11. By this construction the hook member may be engaged under the edge of the tire without moving the entire device. To effectively hold this foot member in said position so that it will not accidentally slip from the tire, a plate 26 is disposed at the side of the hook portion and at the adjacent side of the depending extension 11 and is provided with a laterally bent extension 27 which is pivoted to the depending member 11 so that the plate can only swing in a plane at right angles to the swinging plane of the hook. The lower end of the plate is provided with a lateral extension 28 disposed normally over the face of the hook and the free extremity of this extension is directed laterally as at 29 to form a finger grip whereby the plate may be swung to release the hook, it being noted that when the plate is engaged with this lateral extension 28 disposed on the face of the hook, said hook is held positively against movement.

As it is desirable for the body portion of the device to be disposed vertically or in the plane parallel to the peripheral plane of the tire, coacting brace members 30 and 31 are provided, the former being provided at its upper end with an inwardly off-set portion 32 bolted to one of the side uprights, the brace strip being thus disposed to one side of the handle so as not to interfere therewith, and the other brace strip has one end thereof pivotally secured to the lower end of the brace strip 30 by a bolt 33 passed therethrough and adapted to hold the brace bars in any desired pivotal relation. The lower end of the brace rod 31 is directed laterally at 34 to form a seat portion which rests on one of the spokes to thus hold the member in proper position. In this connection it must be noted that comparatively little strain comes upon these brace members, they merely serving as a guide. To prevent the seat from becoming displaced from the spoke accidentally, the otherwise free end of the seat 34 is extended downwardly and terminates in a hook portion 35 adapted to be disposed under the spoke and engage the spoke so that the body portion can be swung forwardly to thus limit such forward movement and insure the seat 34 resting upon the spoke when the body portion is returned to its normal position.

An important feature of the present device is the comparative simplicity of its parts, this simplicity being procured without departing in any manner from strength and durability of the device, or the ease with which it may be operated, it being noted that the device may be readily adjusted in position on various sizes of wagon wheels and readily and efficiently operated.

It will be understood that minor changes and modifications within the scope of the appended claim may be made without departing in any manner from the spirit of the invention.

What is claimed is:

A tire remover comprising a channel member, a bar slidable in said channel member and provided with a downward extension, means for moving the bar in one direction, means for holding the bar against movement in the other direction, a tire engaging member pivoted to the downward extension and adapted to swing in the plane of the device, a plate disposed at the side of the downward extension of the tire engaging member, a lateral extension on the plate pivoted to the downward extension whereby the plate may be swung on a transverse plane and a lateral extension on the plate adapted to be disposed over the outer face of the tire engaging member to prevent pivotal movement thereof.

In testimony whereof I hereunto affix my signature in the presence of two witnesses.

ANTONE J. ADAMEK.

Witnesses:
ARTHUR LEN,
STEPHAN DUCKECK.

Copies of this patent may be obtained for five cents each, by addressing the "Commissioner of Patents, Washington, D. C."